Patented July 10, 1945

2,380,358

UNITED STATES PATENT OFFICE 2,380,358

POLYMERIZATION OF OLEFINS

John Anderson and Walter H. Peterson, Berkeley, and Sumner H. McAllister, Lafayette, Calif., assignors to Shell Development Company, San Francisco, Calif., a corporation of Delaware No Drawing. Application July 31, 1941,
Serial No. 404,874

10 Claims. (Cl. 260—683.1)

This invention relates to the polymerization of unsaturated hydrocarbons and more particularly to improvements in the catalytic conversion of olefins to unsaturated hydrocarbons having a higher boiling point than the treated material. In one of its specific embodiments, the present invention is directed to an improved process for the manufacture of butylene from ethylene and to the co-polymerization of ethylene with higher homologues thereof, such as propylene and butylene.

It is known that gaseous olefins can be polymerized by subjecting them in the absence of polymerization promoting catalysts to elevated temperatures and, in some cases, to superatmospheric pressure. This method of operation, however, is not satisfactory because the reaction rate and the yield of the desired polymers are usually prohibitively low. Also, a considerable portion of the olefins subjected to such treatment is converted into carbon and low boiling saturated hydrocarbons such as methane, thus reducing the actual and potential yields of desired products of polymerization.

It is also known that ethylene may be polymerized to an oily product suitable, for example, as lubricating oil, by effecting the polymerization in the presence of boron fluoride employed alone or in admixture with other catalytic substances such as finely divided metals. This method of operation is also not satisfactory since the reaction rate and the yields are comparatively low. Ethylene was also polymerized by subjecting it to very high temperatures in the presence of finely divided metals such as cobalt, this reaction being effected at atmospheric pressure and generally at temperatures of above about 200° C. When effected in this manner the reaction rate was also very low, thus rendering the process uneconomical.

It has now been discovered that unsaturated hydrocarbons may be readily polymerized to produce high yields of desired higher boiling products of polymerization by subjecting the unsaturated hydrocarbons, e. g., olefins, to the action of certain finely divided metals under carefully controlled operating conditions. It has been further discovered that ethylene may be polymerized to produce high yields of butylenes by subjecting the ethylene in contact with finely divided metals of the 8th group of the periodic table, and particularly in contact with reduced cobalt and/or reduced nickel, to certain definite temperatures and pressures described in greater detail hereinbelow. Another embodiment of the invention resides in the discovery that ethylene may be co-polymerized with the higher homologues thereof, particularly with propylene and the butylenes, by subjecting mixtures of these olefins, whether employed alone or in combination with other hydrocarbons, to the action of the aforementioned reduced metals such as reduced cobalt, this reaction being effected under superatmospheric pressures and elevated temperatures.

In view of the fact that the polymerization of olefins, such as ethylene and propylene, as well as the co-polymerization of ethylene with the higher homologues thereof, are reactions involving the combining of two or more molecules of these olefins to produce a single molecule having a greater number of carbon atoms per molecule, it would be expected, in view of the well established law of mass action, that pressure and temperature favor these reactions so that both the rate of reaction and the yield of the polymers are increased by effecting the reaction at higher pressures and/or temperatures. It has been discovered, however, that, at least insofar as the polymerization of ethylene to butylene, and the co-polymerization of ethylene with higher olefins, are concerned, there are critical ranges within which the yields of the desired polymers are highest, and that when the reaction is effected at higher temperatures and/or pressures the yield of the polymers drops. For instance, as clearly shown by the examples presented hereinbelow, it has been discovered that the polymerization of ethylene in the presence of reduced cobalt disposed on a highly porous material such as activated carbon, when effected at temperatures of between about 35° C. and 150° C. and preferably between about 80° C. and 120° C., results in a high yield of butylenes when the reaction is effected at superatmospheric pressures of above about 300 lbs. per sq. in., and preferably above about 500 lbs. per sq. in., this yield of butylenes being considerably higher than that which would be obtained when the same reaction is effected at or in the neighborhood of atmospheric pressure. Although the butylene yield is relatively high when the reaction is effected at pressures ranging from the aforementioned pressure of 500 lbs. per sq. in. and as high as 2,000 lbs. per sq. in., it has been discovered that the best yields of butylene are within the preferred range of between about 600 lbs. per sq. in. and 900 lbs. per sq. in., the maximum butylene yield, when the reaction is effected within the aforementioned temperature range, is best when the pressure employed is from about 750 lbs. per sq. in. to about 800 lbs. per sq. in. It has also been discovered that the yield of butylenes, when the polymerization of ethylene is effected in the presence of the above mentioned and hereinbelow more fully discussed metal catalysts at the described superatmospheric pressures, varies with a change in the reaction temperature, and that although this polymerization may be effected within the range of between about 35° C. and 150° C., the highest conversion of ethylene to butylenes is attained when the reaction temperature is between about 80° C. and 120° C. The above temperatures and pressures have also been found to be highly suitable for the co-polymerization of ethylene with other unsaturated hydrocarbons, such as propylene and butylenes.

Although the process of the present invention is applicable to the polymerization of various unsaturated hydrocarbons, such as olefins, it is of particular use for the polymerization of ethylene and propylene. It is to be noted, however, that it was found that the rate of conversion of ethylene to butylenes under the same conditions of operation is considerably higher than the conversion rates of propylene to hexylenes and higher products of polymerization thereof. Therefore, when higher boiling olefins are to be polymerized in accordance with the process of the present invention, somewhat more rigorous conditions of operation may be necessary. In general, it may be said, however, that the present process is applicable to the polymerization of various olefins, particularly mono-olefins of the ethylene series, as well as to the co-polymerization of the various relatively low boiling olefins and especially to the co-polymerization of ethylene with its homologues. e. g. propylene and/or butylenes. Instead of employing pure olefins for the purpose of polymerizing them in accordance with the process of the present invention, it is also possible to employ hydrocarbon mixtures predominating in or containing such olefins. For example, light hydrocarbon fractions consisting of ethane and ethylene may be employed as the starting materials for the purpose of forming butylenes in accordance with the present process. Also, in the case of co-polymerization, it is possible to use hydrocarbon fractions containing, for example, paraffinic hydrocarbons having the same or different numbers of carbon atoms per molecule. These hydrocarbon fractions may, for example, be the result of vapor pressure cracking of light hydrocarbon fractions and may contain various paraffinic hydrocarbons together with the olefins to be polymerized. Of the mono-olefins above ethylene, the present process is highly suited for the treatment of olefins having unsaturated carbon atoms of non-tertiary character, or hydrocarbon fractions containing the same. The process is particularly adapted for the polymerization of olefins having terminally disposed double bonds between non-tertiary carbon atoms.

The polymerization according to the present invention may be effected in the presence of catalysts consisting of the metals of the 8th group of the periodic table. Of particular use for this polymerization are cobalt and nickel, cobalt being the preferred catalyst. The metals employed as the polymerization-promoting catalysts are used in a reduced state and are preferably employed in the form of finely divided particles disposed on various carriers such as pumice, clay and various types of aluminas and alumina silicates. The use of activated carbon as the carrier for the reduced metal, such as reduced cobalt, has been found to be of particular benefit for the conversion of ethylene to produce polymers containing high percentages of the desired butylenes. The use of the carriers for the active catalyst metals is advantageous since it permits an accurate control between the olefins to be polymerized and the metal catalyst in the reaction zone, while maintaining other operating conditions, such as the reaction temperature, pressure, space velocity, contact time, etc., constant. The metal catalyst, e. g. reduced cobalt, whether employed alone or in the preferred form of a finely divided metal disposed on activated carbon, or the like, may be prepared and employed in a variety of ways. For example, it may be used in the form of compact masses, granules, chips, powder, etc. One method of preparing the catalyst for the polymerization according to the present invention includes the steps of absorbing aqueous cobaltous nitrate on activated carbon or the like, decomposing the nitrate to the corresponding oxide by a prolonged heating at an elevated temperature, and finally reducing the oxide by heating while passing hydrogen through the catalyst mass. Other methods of preparing the reduced catalyst metal, as well as the incorporation thereof on to porous carriers, may be employed. The concentration of the active reduced metal catalyst may vary within relatively wide limits, depending on the specific metal employed, the desired contact time, and the like. For example, it has been found that, other conditions being equal, in order to obtain similar conversions of ethylene to butylenes the concentration of nickel on the activated support must be higher than that which may be employed when cobalt is employed as the reaction promoting catalyst. When ethylene is polymerized according to the present invention, and this primary material is conveyed through the reaction zone at the rate of about 250 grams per hour per liter of catalyst space, good conversions have been obtained when the cobalt-to-carbon ratio is in the neighborhood of 14:86. However, much higher or lower concentrations of the catalyst may also be used.

Instead of using a solid catalyst bed through which the reactants are conveyed, it is also possible to effect the polymerization according to the present invention by maintaining the catalyst, e. g. reduced cobalt, whether used alone or on a carrier, in suspension in the reaction zone. This may be effected, for instance, by suspending the catalyst in the liquid polymer and by conveying the olefin to be polymerized therethrough. The suspension of the catalyst (which may be in a fluidized state) may be realized by maintaining it in an agitated state as by blowing, stirring and the like.

The catalyst employed for the polymerization of the unsaturated hydrocarbons may also contain various promoters which when used alone will not catalyze the reaction. As such, reference may be made to the oxides and/or salts of lithium, thorium, copper, silver, zinc, and the like, as well as some of these metals per se. For example, a catalyst consisting of reduced cobalt deposited on a carrier consisting of activated carbon, this catalyst also containing relatively small amounts of silver or reduced copper, is an excellent substance for promoting the polymerization of olefins according to the present invention.

The polymerization according to the present process may be effected in a batch, intermittent or continuous manner. One method of operation comprises the disposition of the catalyst in one or more reaction vessels or tubes, preferably disposed in parallel, and the passage of the unsaturated hydrocarbons to be polymerized through these catalyst-containing reaction tubes under the desired or optimum superatmospheric pressure. The reaction temperature is maintained within the desired range, for instance by an external heating or cooling of the reaction zones. In view of the fact that the polymerization of olefins is an exothermic reaction it is advisable, if not essential, to cool the reactants and reaction products in the reaction zone in order to maintain them within the desired or optimum temperature range. This maintenance of the reaction products at the desired temperature may be effected, for example, by cooling the exterior of the reaction tubes by means of heat extracting fluids. One method of extracting excess heat is to immerse the reaction tubes in water maintained under a partial vacuum so that it will boil at or about the temperature which it is desired to maintain within the reaction zone. By constantly introducing additional amounts of water into the container while removing the evolved steam, the reactants within the reaction zone may thus be maintained at the desired temperature.

The olefins to be polymerized, whether preliminarily heated to the desired reaction temperature or not, may be conveyed through the catalyst-containing reaction zone at a rate sufficient to effect an economic conversion rate. This rate of throughput of the olefins will vary depending on the specific catalyst employed, the olefins to be polymerized, pressure and temperature used, and the desired conversion rate, as will be clear to those skilled in the art. The reaction products withdrawn from the reaction zone may be readily treated to recover the products of polymerization, which may then be further treated to fractionally recover the different polymers obtained. This may be effected by flash distillation followed by stage condensation, or by fractional distillation, or the like.

Although the effective life of the catalyst is quite long, its efficiency nevertheless appears to decrease with use. For example, when the catalyst consisting of reduced cobalt disposed on activated carbon has been used for a relatively long period of time for the conversion of ethylene to polymers predominating in butylene, the conversion rate begins to drop so that with time the process becomes uneconomical because of the low conversion rates. This drop in efficiency is apparently due to the adsorption of the ethylene polymers by the catalyst. In order to regenerate the catalyst it is therefore necessary to remove these adsorbed organic materials. This may be effected by heating the partially spent catalyst to a temperature sufficient to vaporize the impurities. When using impure olefins as the material polymerized according to the present process, the metal of the catalyst is oxidized by the oxygen or oxygen-yielding materials present in the feed. In order to reactivate the catalyst thus poisoned, it is necessary to employ hydrogen during the heating step in order to reduce the metal oxides to the corresponding metal. This hydrogen simultaneously acts as a carrier which sweeps out the vaporized polymers adsorbed during the polymerization step. When the hydrocarbons subjected to polymerization do not contain any oxygen or oxygen-yielding materials, there is no need of employing hydrogen during the regeneration step, and in such cases it is possible to use inert gases, e. g. nitrogen, for the purpose of aiding in the removal of the vaporized polymers. The regeneration of partially spent cobalt catalysts has been successfully realized when the heating was effected at atmospheric pressure and at temperatures in the neighborhood of 300° C. However, less drastic conditions may also be used for this reactivation step.

It is to be understood that the hydrocarbon fractions to be polymerized according to the process should not contain substances such as ethers, organic halides, sulfur and sulfur compounds in amounts sufficient to effect deleteriously the life and activity of the catalyst employed. Therefore, if necessary, the hydrocarbon fractions prior to the polymerization step may be purified by any suitable means. This may be effected, for instance, by conveying the hydrocarbons through a tube containing a partially spent catalyst.

The following detailed examples are given for the purpose of illustrating the present process and the modes of executing the invention. It is to be understood, however, that the invention is not to be considered as limited to the specific modes or conditions of operation disclosed.

*Example I*

The following series of runs were made to determine the effect of reaction temperature on the conversion of ethylene to butylenes and higher polymers, this polymerization being effected in the presence of a catalyst consisting of reduced cobalt deposited on activated carbon. The catalyst used was prepared by absorbing hydrated cobaltous nitrate on 4–10 mesh activated carbon, and then baking the resulting material for a period of between about 12 and 16 hours at a temperature of about 105° C. to remove the water and to effect the decomposition of the cobaltous nitrate to the oxide. Prior to use, the required amount of this semi-finished catalyst was introduced into the reaction zone and reduced in situ by passing hydrogen therethrough at a reaction temperature of about 300° C. In the specific experiments, in which the reactor consisted of a tube 38 inches long, having an internal diameter of 1.03 inches and equipped with an axially disposed thermo-couple well having an external diameter of 0.25 inch, the final reduction of the catalyst was effected by passing hydrogen at 300° C. for 3 hours at the rate of about 4.8 cubic feet per hour per liter of catalyst space.

All of the runs were effected at a pressure of about 750 pounds per sq. in. The ethylene fraction was fed through the reaction zone at the rate of about 250 grams per hour per liter of catalyst space. The reaction temperature was regulated by providing the reactor with a cooling jacket and by varying the temperature of the water conveyed therethrough. The following table shows the effect of temperature on the conversion of the ethylene to polymers, as well as the degree of polymerization, i. e. the percentages of butylenes, hexylenes and higher polymers in the reaction product.

| Reaction tempera- ture, °C. | Material balance (in grams) | | | Result (weight percent) | | Polymer composition (percent) | | |
|---|---|---|---|---|---|---|---|---|
| | Ethylene intro- duced | Unreacted ethylene recovered | Poly- mer | Conver- sion | Loss | Buty- lene | Hexy- lene | Higher poly- mer |
| 4 | 405 | 310 | 51 | 13 | 11 | 65 | 35 | |
| 33 | 426 | 214 | 212 | 50 | 1 | 56 | 28 | 16 |
| 41 | 418 | 110 | 234 | 59 | 17 | 53 | 30 | 17 |
| 43 | 414 | 113 | 251 | 61 | 12 | 57 | 28 | 15 |
| 80 | 433 | 132 | 303 | 70 | 1 | 56 | 24 | 20 |
| 109 | 425 | 121 | 303 | 71 | 1 | 61 | 23 | 16 |
| 150 | 414 | 204 | 178 | 57 | 6 | 65 | 20 | 15 |

The above results clearly show that the effect of temperature on the polymerization of ethylene, when realized at a superatmospheric pressure of about 50 atmospheres in the presence of a catalyst consisting of reduced cobalt on activated carbon, is not a straight line function, but that the conversion (per pass) increases with an increase in temperature to between about 80° C. and 100° C., this conversion dropping when the reaction temperature is further increased. Although the above runs were effected at a pressure of 750 lbs. per sq. in., the optimum operating temperature range will be approximately the same when the reaction is effected at other pressures, e. g. at about 500 lbs. per sq. in.

*Example II*

A series of runs were conducted to show the effect of pressure on the polymerization of ethylene. These runs were effected at a reaction temperature of between about 35° C. and 40° C. at pressures varying between about 250 lbs. per sq. in. and about 1000 lbs. per sq. in. The other conditions of operation (including the catalyst employed) were the same as those used in the runs described in the previous example. The results obtained are presented in the following table:

| Pressure employed, lbs./sq. in. | Material balance (in grams) | | | Result (weight percent) | | Polymer composition (percent) | | |
|---|---|---|---|---|---|---|---|---|
| | Ethylene intro- duced | Unreacted ethylene recovered | Poly- mer | Conver- sion | Loss | Buty- lene | Hexy- lene | Higher poly- mer |
| 250 | 280 | 214 | 66 | 23 | | 94 | 6 | |
| 500 | 392 | 221 | 163 | 42 | 2 | 65 | 20 | 15 |
| 625 | 325 | 102 | 203 | 63 | 6 | 64 | 24 | 12 |
| 750 | 366 | 110 | 234 | 63 | 6 | 53 | 30 | 17 |
| 850 | 351 | 183 | 168 | 48 | | 61 | 27 | 12 |
| 950 | 374 | 157 | 216 | 45 | 13 | 65 | 24 | 11 |
| 970 | 391 | 211 | 148 | 38 | 8 | 61 | 29 | 10 |

The above results indicate that the conversion of ethylene to polymers thereof, when effected with a fresh cobalt catalyst, increases with reaction pressure until the pressure is in the neighborhood of 750 to 800 lbs. per sq. in., and that conversion begins to drop when the reaction is effected at greater pressures.

*Example III*

Ethylene was polymerized in a series of experiments which were effected at a temperature of 35 to 40° C. in the same apparatus as that employed in the previous examples, the throughput of ethylene being at the rate of about 250 grams per hour per liter of catalyst space. Instead of employing fresh cobalt catalyst, these series of polymerizations were effected at various pressures with previously used catalysts consisting of cobalt disposed on activated carbon, this catalyst having been then reactivated by subjecting it to the action of hydrogen at a temperature of about 300° C. and at atmospheric pressure. The runs were effected at pressures ranging from about 250 lbs. per sq. in. to about 1000 lbs. per sq. in., the results of these runs being presented in the following table.

| Pressure employed, lbs./sq. in. | Material balance (in grams) | | | Result (weight percent) | | Polymer composition (percent) | | |
|---|---|---|---|---|---|---|---|---|
| | Ethylene intro- duced | Unreacted ethylene recovered | Poly- mer | Conver- sion | Loss | Buty- lene | Hexy- lene | Higher poly- mer |
| 250 | 405 | 316 | 103 | 18 | 4 | 77 | 23 | |
| 500 | 371 | 231 | 122 | 33 | 5 | 66 | 20 | 14 |
| 625 | 412 | 186 | 178 | 43 | 12 | 66 | 24 | 11 |
| 750 | 937 | 344 | 531 | 57 | 7 | 52 | 32 | 16 |
| 850 | 404 | 114 | 241 | 60 | 12 | 51 | 31 | 18 |
| 960 | 395 | 153 | 212 | 53 | 6 | 63 | 23 | 14 |

An analysis of the above data indicates that the polymerization of ethylene with a regenerated cobalt catalyst on activated carbon results in an increased yield of products of polymerization when the pressure is raised until a maximum is reached, after which further increase in the pressure causes lower conversion rates. However, when employing a regenerated catalyst, the maximum conversion is apparently obtained with somewhat higher pressures, namely, in the neighborhood of 800-900 lbs. per sq. in. This may be due to an insufficient regeneration of the catalyst.

*Example IV*

Substantially pure ethylene was conveyed through the above described reactor containing a catalyst consisting of cobalt deposited on activated carbon. The temperature within the reaction zone was maintained at 90° C. and the ethylene was fed through the reactor at a pressure of 800 lbs. per sq. in. and at a rate of 275 grams per hour per liter of catalyst space. The reaction was continued for a period of 8 hours. During the last 6 hours of this period the conversion was equal to 86%, the production of polymers being at the rate of 236 grams per hour per liter of catalyst space. Approximately 66% of the polymers consisted of butylenes.

When ethylene was conveyed at temperatures of around 100° C. over the same catalyst but under substantially atmospheric pressure, only negligible amounts of polymers were obtained. In fact, in order to obtain noticeable conversion of ethylene to butylene (when conducting the reaction at atmospheric pressure) it was necessary to raise the temperature to about 225° C. At this temperature the conversion was equal to about 6%, based on the ethylene throughput.

*Example V*

Substantially pure propylene was conveyed at a rate of about 432 grams per hour per liter of catalyst space through the apparatus employed in the previous examples, the reaction space of this apparatus containing reduced cobalt deposited on activated carbon. The reaction temperature within the reactor was maintained at 36° C., the propylene being conveyed through at a pressure of about 750 lbs. per sq. in. The reaction was conducted for a period of 6 hours, during which time 648 grams of propylene were conveyed through, of which 567 grams were recovered unreacted, thus showing a conversion of about 13%. Of the polymer thus obtained 93% consisted of hexylenes, the remainder consisting of nonylenes and higher unsaturated hydrocarbons. The relatively low conversion of propylene to hexylene is due to the low temperatures and pressures employed, considerably higher conversion rates being obtained when the reaction is effected under more rigorous conditions.

*Example VI*

A hydrocarbon mixture consisting of 58% ethylene and 42% propylene was conveyed through the same apparatus as that employed in the previous example, the operating conditions being substantially the same. During a period of 6 hours during which approximately 688 grams of the above hydrocarbon mixture were conveyed through the reactor, approximately 114 grams of polymer were obtained. The conversion was equal to 29%, based on the ethylene employed, and 13% as calculated on the propylene conveyed. An analysis of the polymer showed the following composition:

| | Per cent |
|---|---|
| Butylenes | 43 |
| Amylenes | 30 |
| Hexylenes | 12 |
| Heptylenes | 6 |
| Higher homologues | 9 |

This analysis clearly shows that considerable co-polymerization of the ethylene with the propylene, as well as the co-polymerization of butylenes (produced by the polymerization of ethylene) and propylene, occurred.

The products obtained from the various polymerizations and co-polymerizations when effected according to the process of the present invention are almost entirely straight-chain olefins. For instance, the polymerization of ethylene according to this process produces alpha butylene and/or beta butylene, the reaction product being substantially free of isobutylene. Also, since the reaction is a clean-cut polymerization which forms dimers, trimers and tetramers, these can be readily separated by simple distillation. Furthermore, it is to be noted that the yield of the desired butylenes may be controlled by regulating the temperatures, pressures and residence times in the reactor.

It was also found that the temperature and, to a certain degree, the reaction time have a marked influence on the type of butylene obtainable by the polymerization of ethylene according to the process of the present invention. When two molecules of ethylene are polymerized to form a mono-olefin having four carbon atoms per molecule, it is to be expected that this butylene would be unsaturated in the alpha position. This is true when the reaction is effected at the specified high pressures but relatively lower temperatures. Also, the butylene fraction predominates in alpha butylene when the reactants are maintained in the reaction zone for relatively short periods of time. However, it was found that with an increase in temperature the alpha butylene is isomerized to produce beta butylene. For example, maintaining the other conditions constant, an increase in the operating temperature from about 38° C. to about 110° C. raises the beta butylene content of the butylene fraction from 35% to 72%. Similarly, when operating at 750 lbs. per sq. in. and at a temperature near the lower range specified hereinabove, by increasing the residence time of ethylene 5 times the beta butylene content of the butylene fraction of the polymers obtained is raised from about 48% to as high as 93%. Therefore, by selecting optimum conditions of operation within those described herein it is possible to obtain the polymerization of the ethylene to produce high yields of butylenes and also to effect, when desired, the simultaneous isomerization of the alpha butylene to the beta butylene.

We claim as our invention:

1. The process for the production of normal butylenes which comprises contacting ethylene with reduced cobalt deposited on activated carbon at a temperature of from about 80° C. to about 120° C. and at a pressure of from about 750 lbs. to about 800 lbs., whereby ethylene is polymerized to straight-chain olefins predominating in normal butylenes.

2. The process for the production of straight-chain olefins having at least four carbon atoms to the molecule which comprises contacting normally gaseous hydrocarbons comprising ethylene with reduced cobalt deposited on activated carbon at a temperature of from about 80° C. to about 120° C. and at a pressure of from about 750 lbs. to about 800 lbs., whereby ethylene is polymerized to higher straight-chain olefins in the absence of any substantial amount of side reactions.

3. The process for the production of normal butylenes which comprises contacting ethylene with reduced cobalt deposited on activated carbon at a temperature of from about 35° C. to about 150° C. and a pressure of from about 600 lbs. to about 900 lbs., whereby ethylene is polymerized to straight-chain olefins predominating in normal butylenes.

4. The process for the dimerization of normally gaseous straight-chain olefinic hydrocarbons which comprises contacting normally gaseous hydrocarbons comprising a straight-chain olefinic hydrocarbon with a catalyst comprising reduced cobalt deposited upon activated carbon at a temperature of from about 35° C. to about 150° C. and at a pressure of from 600 lbs. to about 900 lbs., whereby said olefinic hydrocarbon is polymerized to straight-chain olefinic hydrocarbons predominating in the dimer of said olefinic hydrocarbon.

5. The process for the co-polymerization of ethylene and propylene which comprises contacting an admixture of ethylene and propylene with reduced cobalt deposited on activated carbon at a temperature of from about 35° C. to about 150° C. and at a pressure of from about 300 lbs. to about 900 lbs.

6. The process for the co-polymerization of ethylene and a straight-chain olefinic hydrocarbon which comprises contacting an admixture of ethylene and propylene with reduced cobalt deposited on activated carbon at a temperature of from about 35° C. to about 150° C. and a pressure of from about 300 lbs. to about 900 lbs.

7. The process for the production of normal butylenes which comprises contacting ethylene with a reduced metal selected from the group consisting of nickel and cobalt deposited upon activated carbon at a temperature of from about 80° C. to about 120° C. and at a pressure of from about 750 lbs. to about 800 lbs., whereby ethylene is polymerized to straight-chain olefins predominating in normal butylenes.

8. The process for the production of higher boiling straight-chain olefinic hydrocarbons from lower boiling olefinic hydrocarbons which comprises contacting normally gaseous hydrocarbons comprising a straight-chain olefin with a catalyst comprising activated carbon and a reduced metal selected from the group consisting of nickel and cobalt at a temperature of from about 35° C. to about 150° C. and at a pressure of from about 300 lbs. to about 900 lbs.

9. The process for the polymerization of straight-chain olefins which comprises the alternate steps of contacting normally gaseous hydrocarbons comprising a straight-chain olefin with a catalyst comprising activated carbon and a reduced metal selected from the group consisting of nickel and cobalt at a temperature of from about 35° C. to about 150° C. and at a pressure of from about 300 lbs. to about 900 lbs., and heating the catalyst at a temperature of about 300° C.

10. The process for the polymerization of straight-chain olefins which comprises the alternate steps of contacting normally gaseous hydrocarbons comprising a straight-chain olefin with a catalyst comprising activated carbon and a reduced metal selected from the group consisting of nickel and cobalt at a temperature of from about 35° C. to about 150° C. and at a pressure of from about 300 lbs. to about 900 lbs., and heating the catalyst at a temperature of about 300° C. and at substantially atmospheric pressure in the presence of a hydrogen-containing gas.

JOHN ANDERSON.
WALTER H. PETERSON.
SUMNER H. McALLISTER.